Figure 1:
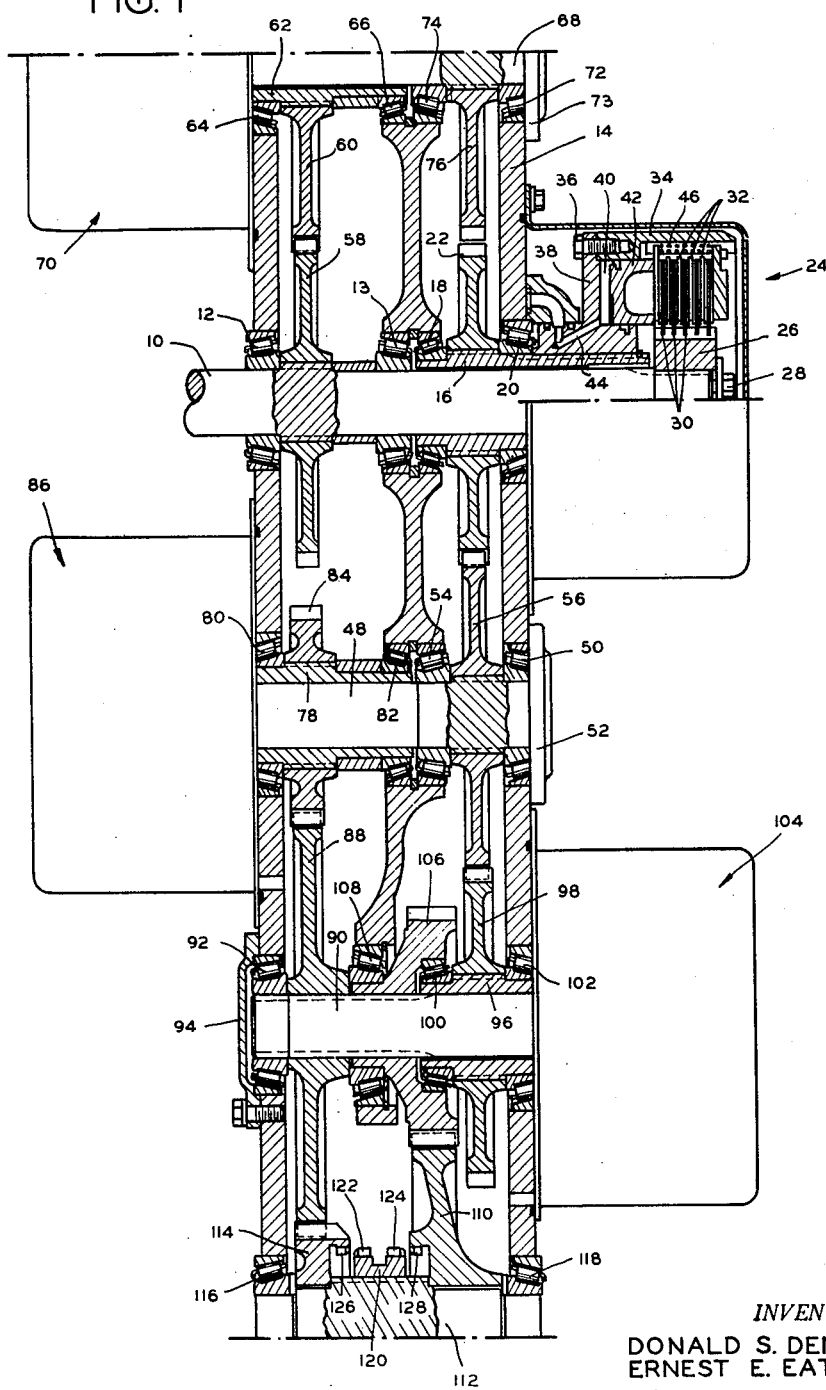

Oct. 29, 1957    D. S. DENCE ET AL    2,811,048
TRANSMISSION
Filed March 8, 1954    2 Sheets-Sheet 1

INVENTORS.
DONALD S. DENCE
ERNEST E. EATON
BY J. Frederick Bechtel
ATTY.

Oct. 29, 1957   D. S. DENCE ET AL   2,811,048
TRANSMISSION

Filed March 8, 1954   2 Sheets-Sheet 2

INVENTORS.
DONALD S. DENCE
ERNEST E. EATON
BY
ATTY.

United States Patent Office 2,811,048
Patented Oct. 29, 1957

2,811,048

TRANSMISSION

Donald S. Dence and Ernest E. Eaton, Jackson, Mich., assignors to Clark Equipment Company, a corporation of Michigan Application March 8, 1954, Serial No. 414,791

11 Claims. (Cl. 74—360)

Our present invention relates generally to transmissions for vehicles such as trucks, tractors, and the like, and, more specifically, to transmissions having multiple forward and reverse drive speeds.

It is an object of our present invention to provide a transmission having multiple forward and reverse drive speeds wherein changes in direction of drive and drive ratio may be quickly and smoothly effected.

It is another object of our present invention to provide a transmission with primary drive means and reverse drive means wherein each of the drive means is selectively operable for driving common multi-speed gear means.

In the accomplishment of the foregoing objects, we provide an input shaft with a primary drive gear rotatable thereabout and having associated therewith first clutch means for clutching the primary drive gear to the input shaft. In addition, a first countershaft is arranged parallel to the input shaft and has secured thereto a first torque transmitting gear which is driven by the primary drive gear when the first clutch means is engaged. Reverse drive gear means, including reverse drive clutch means, is drivingly associated with the input shaft and the first torque transmitting gear with the latter gear being driven in a reverse direction when the reverse drive clutch means is engaged. A second torque transmitting gear is rotatable about the first countershaft and second clutch means is provided for clutching the second torque transmitting gear to the first countershaft. Finally, multiple speed gear means having meshing engagement with the first and second torque transmitting gears is arranged so as to be driven by the first torque transmitting gear in one drive range relative to the input shaft when the second clutch means is disengaged and driven by the second torque transmitting gear in a second drive range relative to the input shaft when the second clutch means is engaged. By virtue of this construction, multiple forward and reverse drive speeds may be selectively obtained.

It is still another object of our present invention to provide a transmission which is of minimum axial extent and one wherein the shafts thereof are offset so that the gearing of the transmission occupies a minimum of space.

It is a further object of our present invention to provide a transmission which is of rugged and economical construction and one which may be easily and quickly assembled and serviced.

Now, in order to acquaint those skilled in the art with the manner of constructing and using transmissions built in accordance with the principles of our present invention, we shall describe in connection with the accompanying drawings a preferred embodiment of our invention.

Figure 2:
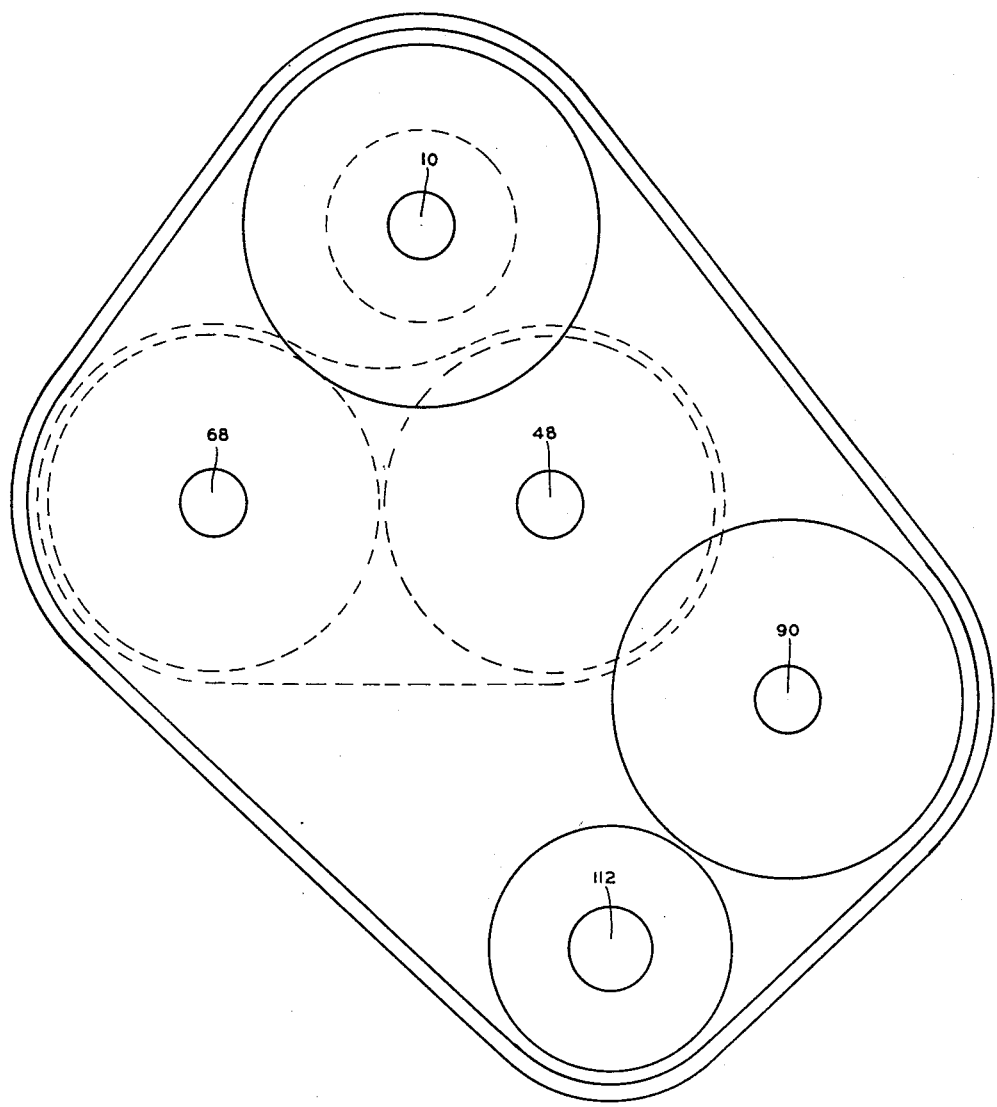

In the drawings:

Figure 1 is a sectional view of the transmission of our present invention with the transmission shafts being shown revolved out of their normal position and in a common plane for the sake of clarity; and Figure 2 is a diagrammatic end view of the transmission of Figure 1 and shows the geometric arrangement of the shafts.

Referring now to the drawings, there is indicated at 10 the input shaft of the transmission of our present invention. The input shaft 10 is adapted to have suitable connection with a main friction disc clutch, or a fluid torque converter, driven by a prime mover such as an internal combustion engine. The input shaft 10 is journaled in tapered roller bearing assemblies 12 and 13 which are suitably arranged within the forward end wall and an intermediate wall of the transmission housing 14.

A sleeve member 16 is suitably journaled about the input shaft 10 within tapered roller bearing assemblies 18 and 20 which are positioned in the intermediate and rear end walls of the transmission housing 14. Suitably splined to the sleeve member 16, inwardly of the rear wall of the transmission housing 14, is a primary drive gear 22 which, together with the sleeve member 16 is adapted to be clutched to the input shaft 10 by means of clutch means indicated generally by the reference numeral 24.

The clutch means 24 is detachably mounted to the rear wall of the transmission housing and comprises an inner clutch hub 26 which is suitably keyed to the rear end of the input shaft 10 and is held in position by means of a bolt and washer assembly 28. The outer periphery of the clutch hub 26 is splined, and arranged for axial movement along these splines are a plurality of annular clutch discs 30. The discs 30 are arranged alternately with respect to annular clutch discs 32 which at their outer peripheries are splined for axial movement along the internal splines formed in the outer annular clutch hub 34. The clutch hub 34 is secured by means of a plurality of circumferentially spaced bolts 36 to a flange assembly 38 suitably splined to the rear end of the sleeve member 16. The outer clutch hub 34 and flange assembly 38 are also arranged so as to define an annular fluid chamber 40 in which is mounted for axial movement an annular piston 42. Fluid under pressure is adapted to be selectively admitted to the chamber 40 through fluid passageway means indicated generally at 44. The fluid passageway means 44 is adapted to be placed in communication with a source of fluid under pressure through suitable control valve means. Since the control valve means does not form part of our present invention, we have not included a showing or description thereof.

Upon the admission of fluid under pressure to the chamber 40, the piston 42 is urged to the right as viewed in Figure 1, thereby urging the clutch discs 30 and 32 into clutching engagement whereupon the gear 22 and sleeve member 16 are clutched to the input shaft 10 for conjoint rotation therewith. The gear 22 may be declutched from the input shaft 10 by bleeding the fluid under pressure from the chamber 40 so as to permit the coil spring assemblies 46 to spread the clutch discs 30 and 32 apart.

The transmission of our present invention further comprises a first countershaft 48 which is arranged below the input shaft 10 at one side of a median plane passing through the axis of the input shaft 10, as viewed in Figure 2. The first countershaft 48 is journaled at its rear end in a tapered roller bearing assembly 50 which is retained in the rear end wall of the transmission housing 14 by means of a removable cover member 52. The first countershaft 48 is further journaled intermediate of its ends in a tapered roller bearing assembly 54 which is retained in the intermediate transmission wall. Splined to the first countershaft 48 immediately inwardly of the rear wall of the transmission housing 14 is a torque transmitting gear 56 which has meshing engagement with the primary drive gear 22 and is adapted to be driven thereby for establishing forward drive when the clutch means 24 is engaged.

The torque transmitting gear 56 is also adapted to be driven by reverse drive gear means which includes an intermediate gear 58 secured to the input shaft 10 immediately inwardly of the forward wall of the transmission housing 14. The intermediate gear 58 has constant meshing engagement with an intermediate gear 60 secured to a sleeve member 62 which is journaled in tapered roller bearing assemblies 64 and 66 retained in the front and intermediate walls of the transmission housing 14. The sleeve member 62 surrounds a reverse drive shaft 68, which as shown in Figure 2, lies below the input shaft 10 at the side of the median plane passing through the input shaft 10 opposite the countershaft 48.

The sleeve member 62 and reverse drive shaft 68 are adapted to be clutched together for conjoint rotation by means of reverse drive fluid actuated friction dics clutch means indicated generally at 70 which is detachably secured to the forward wall of the transmission housing. The reverse drive clutch means 70 is of the same construction, and operates in the same manner, as the clutch means 24 described in detail hereinbefore and it is therefore believed that a full showing and description of the clutch means 70 is unnecessary for purposes of the present disclosure. The reverse drive shaft 68 is journaled at its rear end in a tapered roller bearing assembly 72, held in place by a cover 73, and intermediate of its ends in a tapered roller bearing assembly 74. A gear 76 is secured to the reverse drive shaft 68 immediately inwardly of the rear wall of the transmission housing 14 and the gear 76 has meshing engagement with the torque transmitting gear 56 which has been described hereinbefore.

From the foregoing description it will be seen that the torque transmitting gear 56 may be driven in a forward direction by means of the primary drive gear 22 when the clutch means 24 is engaged or the gear 56 may be driven in a reverse direction by means of the reverse drive gear 76 when the reverse drive clutch means 70 is engaged.

We shall now describe the multi-speed gear means which is driven by the gear 56. A sleeve member 78 is journaled about the first countershaft 48 and also within tapered roller bearing assemblies 80 and 82 which are retained in the forward and intermediate walls of the transmission housing 14. In addition, a torque transmitting gear 84 is splined to the sleeve 78 immediately inwardly of the forward wall of the transmission housing 14 and the gear 84, together with the sleeve member 78, is adapted to be clutched to the countershaft 48 for conjoint rotation therewith by means of fluid actuated friction disc clutch means indicated generally by the reference numeral 86. The clutch means 86 is detachably secured to the forward wall of the transmission housing and is identical in construction and operation to the clutch means 24 described hereinbefore.

The gear 84 has constant meshing engagement with a torque transmitting gear 88 splined on a second countershaft 90 which, at its forward end, is journaled in a tapered roller bearing assembly 92 secured in the forward end wall of the transmission housing 14 by a suitable cover member 94. The shaft 90 is parallel to shaft 48 and lies therebelow at the side of the median plane passing through the axis of shaft 48 opposite the reverse drive shaft 68, as shown in Figure 2. The second countershaft 90 has a sleeve member 96 journaled thereabout and the sleeve member 96 has a gear 98 splined thereto which has meshing engagement with the aforedescribed gear 56. The sleeve member 96, at the sides of the gear 98, is journaled in tapered roller bearing assemblies 100 and 102. Suitable fluid actuated friction disc clutch means indicated generally at 104 is detachably secured to the rear wall of the transmission housing and is operable for clutching the gear 98 and sleeve member 96 to the second countershaft 90. The clutch means 104 is identical in construction and operation to the aforedescribed clutch means 24.

The second countershaft 90 is adapted to be driven in either direction through the suitable actuation of either the clutch means 24 or the clutch means 70. In addition, the second countershaft 90 is adapted to be driven in either one of two drive ranges relative to the input shaft 10. When the clutch means 86 is engaged, and with the clutch means 104 disengaged, the countershaft 90 is driven in one drive range from the gear 56 through the shaft 48 and gears 84 and 88. A second drive range is obtained through the gears 56 and 98 when the clutch means 104 is engaged and the clutch means 86 disengaged.

The transmission further comprises a torque transmitting gear 106 which is splined to the second countershaft 90, intermediate of the ends thereof. The gear 106, at one side, is journaled on the aforenoted tapered roller bearing assembly 100, and, at its other side, within a tapered roller bearing assembly 108 retained in the intermediate wall of the transmission housing. The gear 106 has constant meshing engagement with a gear 110 which is journaled on an output shaft 112 adjacent the rear end thereof.

The output shaft 112 is parallel to the other shafts of the transmission and the axis thereof lies below the second countershaft 90 between median planes passing through the axes of the shafts 48 and 90. The output shaft 112 is adapted to have suitable connection in a known manner with the drive axle of the vehicle in which the transmission of my present invention is embodied.

The aforenoted gear 88 on the second countershaft 90 has constant meshing engagement with a gear 114 which is journaled on the output shaft 112 adjacent the forward end thereof. The output shaft 112 is journaled at its ends within tapered roller bearing assemblies 116 and 118 and intermediate of its ends provides support for an axially movable clutch collar member 120. The clutch collar member 120 is formed with axially spaced external clutch teeth 122 and 124 which are engageable respectively with jaw clutch teeth 126 and 128 formed on the sides of the aforenoted gears 114 and 110. Axial movement of the clutch collar member 120 may be effected by suitable shifter fork means, as will be understood by those skilled in the art.

The output shaft 112 is adapated to be driven in either one of two drive ratios relative to the second countershaft 90. When the clutch collar member 120 is moved to the right from the position shown in Figure 1, the gear 110 is clutched to the output shaft 112 and drive is established between the shafts 90 and 112 in one drive ratio through the gears 106 and 110. When the clutch collar member 120 is moved to the left from the position shown in Figure 1, the gear 114 is clutched to the output shaft 112 and drive is established between the shafts 90 and 112 in a second drive ratio through the gears 88 and 114.

From the foregoing description it will become apparent that the arrangement of gears in the transmission of our present invention permits the output shaft 112 to be driven in either direction in either one of four speeds. Thus, we have provided a transmission having multiple forward and reverse drive speeds wherein changes in direction of drive and drive ratio may be quickly and smoothly effected because of the employment of fluid actuated friction disc clutch means.

In order to obtain compactness, common multi-speed gear means is associated with the primary drive means and the reverse drive means, and the shafts of the transmission are offset so that the gearing occupies a minimum of space. Also, throughout the transmission, bearing assemblies have been disposed at each side of the gears so as to provide a rugged construction. Finally, the clutch means have been arranged exteriorly of the transmission housing so as to facilitate assembly and servicing of the transmission.

Now, while we have shown and described what we believe to be a preferred embodiment of our present invention, it will be understood that various rearrange-

We claim:

1. A transmission comprising an input shaft, a primary drive gear rotatable about said input shaft, first clutch means for clutching said primary drive gear to said input shaft, a first torque transmitting gear driven by said primary drive gear when said first clutch means is engaged, a second shaft, reverse drive means including reverse drive clutch means coaxial with said second shaft and drivingly connected with said input shaft and an intermediate gear meshing with said first torque transmitting gear with the latter gear being driven in a reverse direction when said reverse drive clutch means is engaged, an output shaft, and multi speed gear means drivingly associated with said first torque transmitting gear and said output shaft whereby the latter may be driven in either direction in any one of several speeds.

2. A transmission comprising an input shaft, a primary drive gear rotatable about said input shaft, first clutch means for clutching said primary drive gear to said input shaft, a countershaft, a first torque transmitting gear secured to said countershaft and meshing with the said primary drive gear and being driven by the primary drive gear when said first clutch means is engaged, reverse drive gear means including reverse drive clutch means drivingly associated with said input shaft and said first torque transmitting gear with the latter gear being driven in a reverse direction when said reverse drive clutch means is engaged, a second torque transmitting gear rotatable about said countershaft, second clutch means for clutching said second torque transmitting gear to said countershaft, and gear means having meshing engagement with said first and second torque transmitting gears and being adapted to be driven by said first torque transmitting gear in one drive range relative to said input shaft when said second clutch means is disengaged and being driven by said second torque transmitting gear in a second drive range relative to said input shaft when said second clutch means is engaged.

3. A transmission comprising an input shaft, a primary drive gear rotatable about said input shaft, first clutch means for clutching said primary drive gear to said input shaft, a first intermediate gear secured to said input shaft, a reverse drive shaft, a second intermediate gear rotatable about said reverse drive shaft and meshing with said first intermediate gear, reverse drive clutch means for clutching said second intermediate gear to said reverse drive shaft, a reverse drive gear secured to said reverse drive shaft, a countershaft, a first torque transmitting gear secured to said countershaft and being driven either by said primary drive gear when said first clutch means is engaged or by said reverse drive gear when said reverse drive clutch means is engaged, a second torque transmitting gear rotatable about said countershaft, second clutch means for clutching said second torque transmitting gear to said countershaft, and gear means having meshing engagement with said first and second torque transmitting gears and being adapted to be driven by said first torque transmitting gear in one drive range relative to said input shaft when said second clutch means is disengaged and being driven by said second torque transmitting gear in a second drive range relative to said input shaft when said second clutch means is engaged.

4. A transmission comprising an input shaft, a primary drive gear rotatable about said input shaft, first clutch means for clutching said primary drive gear to said input shaft, a first countershaft, a first torque transmitting gear secured to said first countershaft and being driven by said primary drive gear when said first clutch means is engaged, a second torque transmitting gear rotatable about said first countershaft, second clutch means for clutching said second torque transmitting gear to said first countershaft, a second countershaft, a third torque transmitting gear secured to said second countershaft and meshing with said second torque transmitting gear, a fourth torque transmitting gear rotatable about said second countershaft and meshing with said first torque transmitting gear, third clutch means for clutching said fourth torque transmitting gear to said second countershaft, said second countershaft being driven by said third torque transmitting gear in one drive range relative to said input shaft when said second clutch means is engaged and being driven by said fourth torque transmitting gear in a second drive range relative to said input shaft when said third clutch means is engaged, a fifth torque transmitting gear secured to said second countershaft, an output shaft, a sixth torque transmitting gear rotatable about said output shaft and meshing with said fifth torque transmitting gear, a seventh torque transmitting gear rotatable about said output shaft and meshing with said third torque transmitting gear, fourth clutch means for clutching either said sixth or seventh torque transmitting gear to said output shaft, and said output shaft being driven by said sixth torque transmitting gear at one drive ratio relative to said second countershaft when said fourth clutch means clutches said sixth gear to said output shaft and being driven by said seventh torque transmitting gear at a second drive ratio relative to said second countershaft when said fourth clutch means clutches said seventh gear to said output shaft.

5. A transmission comprising an input shaft, a primary drive gear rotatable about said input shaft, first clutch means for clutching said primary drive gear to said input shaft, a first intermediate gear secured to said input shaft, a reverse drive shaft, a second intermediate gear rotatable about said reverse drive shaft and meshing with said first intermediate gear, reverse drive clutch means for clutching said second intermediate gear to said reverse drive shaft, a reverse drive gear secured to said reverse drive shaft, a first countershaft, a first torque transmitting gear secured to said first countershaft and being driven either by said primary drive gear when said first clutch means is engaged or by said reverse drive gear when said reverse drive clutch means is engaged, a second torque transmitting gear rotatable about said first countershaft, second clutch means for clutching said second torque transmitting gear to said first countershaft, a second countershaft, a third torque transmitting gear secured to said second countershaft and meshing with said second torque transmitting gear, a fourth torque transmitting gear rotatable about said second countershaft and meshing with said first torque transmitting gear, third clutch means for clutching said fourth torque transmitting gear to said second countershaft, said second countershaft being driven by said third torque transmitting gear in one drive range relative to said input shaft when said second clutch means is engaged and being driven by said fourth torque transmitting gear in a second drive range relative to said input shaft when said third clutch means is engaged, a fifth torque transmitting gear secured to said second countershaft, an output shaft, a sixth torque transmitting gear rotatable about said output shaft and meshing with said fifth torque transmitting gear, a seventh torque transmitting gear rotatable about said output shaft and meshing with said third torque transmitting gear, fourth clutch means for clutching either said sixth or seventh torque transmitting gear to said output shaft, and said output shaft being driven by said sixth torque transmitting gear at one drive ratio relative to said second countershaft when said fourth clutch means clutches said sixth gear to said output shaft and being driven by said seventh torque transmitting gear at a second drive ratio relative to said second countershaft when said fourth clutch means clutches said seventh gear to said output shaft.

6. In a change speed transmission having an input shaft and a countershaft, a first torque transmitting gear secured to the countershaft, selective forward and reverse driving means connected between the input shaft and the countershaft including a forward drive gear in mesh with the said first torque transmitting gear and a reverse drive gear also in mesh with the first torque transmitting gear, a second torque transmitting gear mounted on and rotatable about the said countershaft, clutch means for clutching the said second torque transmitting gear to the said countershaft, and gear means having meshing engagement with the said first and second torque transmitting gears and being adapted to be driven by said first torque transmitting gear in a first drive range relative to said input shaft when said clutch means is disengaged and being driven by said second torque transmitting gear in a second drive range relative to said input shaft when the clutch means is engaged.

7. In a transmission, forward and rear vertically disposed walls, an intermediate wall between the said forward and rear walls forming respectively first and second spaces, an input shaft extending through the three walls, a first pair of gears mounted on the said input shaft respectively in the said two spaces, a clutch mounted on the external surface of the said rear wall concentrically with the said input shaft and arranged to connect one of the said first pair of gears to the input shaft, a reverse shaft extending through the forward wall and the intermediate wall, a second pair of gears mounted on the said reverse shaft respectively in the said two spaces, a clutch mounted on the external surface of the front wall concentrically with the said reverse shaft and arranged to connect one of the said second pair of gears to the reverse shaft, a countershaft extending through the front and intermediate walls, a third pair of gears mounted on the said countershaft respectively in the said two spaces, a third clutch mounted on the external surface of the front wall concentrically with the said countershaft and arranged to connect one of said third pair of gears to the countershaft, and an output shaft arranged to be driven by gear means from the said countershaft and extending through at least one of the outside walls.

8. In a transmission, forward and rear vertically disposed walls, an intermediate wall between the said forward and rear walls forming respectively first and second spaces, an input shaft extending through the three walls and having a first pair of gears mounted thereon respectively in the said two spaces, two pairs of antifriction bearings for the said input shaft and first pair of gears mounted on the said walls with each gear having a pair of bearings located fore and aft thereof, a reverse shaft extending through the said forward and intermediate walls and having a second pair of gears mounted thereon respectively in the said two spaces, two additional pairs of antifriction bearings for the said reverse shaft and second pair of gears mounted on the said walls with each gear having a pair of bearings located fore and aft thereof, a countershaft extending through the said front and intermediate walls and having a third pair of gears mounted on the countershaft respectively in the said two spaces, and two more pairs of antifriction bearings for the said countershaft and third pair of gears mounted on the said walls with each gear having a pair of bearings located fore and aft thereof.

9. In a transmission, forward and rear vertically disposed walls, an intermediate wall between the said forward and rear walls forming a first space between the forward and intermediate walls and a second space between the intermediate and rear walls, an input shaft extending through the three walls, a first pair of gears mounted on the said input shaft and located respectively in the said two spaces including a gear in the first space fixed to the input shaft for rotation therewith and a gear in the second space rotatably mounted on the input shaft, a clutch located on the external surface of the said rear wall concentrically with the said input shaft and arranged to connect the input shaft and its rotatably mounted gear, a reverse shaft extending through the front and intermediate walls and journalled on the rear wall, a second pair of gears mounted on the said rear reverse shaft respectively in the said two spaces with the gear in the first space being rotatably mounted and the gear in the second space being fixed to the reverse shaft for rotation therewith and the rotatable gear being in mesh with the fixed gear on the said input shaft, a clutch mounted on the external surface of the front wall concentrically with the said reverse shaft and arranged to connect the reverse shaft to its rotatable gear, a countershaft extending through the front and intermediate walls and journalled on the rear wall, a third pair of gears mounted on the said countershaft and located respectively in the said first and second spaces with the gear in the second space being fixed on the countershaft for rotation therewith and in mesh with both the rotatable gear on the input shaft and the fixed gear on the reverse shaft and the gear in the first space on the countershaft being rotatable with respect thereto, a clutch located on the external surface of the said front wall concentrically with the said countershaft and arranged to connect the countershaft to its rotatable gear, a second countershaft extending through the rear and intermediate walls and journalled on the front wall, a fourth pair of gears mounted on the said second countershaft respectively in the said two spaces with the gear in the first space being fixed to the second countershaft for rotation therewith and in mesh with the rotatable gear on the said first countershaft and the gear in the second space being rotatable with respect to the second countershaft and in mesh with the fixed gear on the first countershaft, a clutch mounted on the external surface of the rear wall concentrically with the said second countershaft and arranged to connect the second countershaft with its rotatable gear, a third gear fixed on the said second countershaft for rotation therewith, an output shaft extending through the front and rear walls and having a pair of gears rotatably mounted thereon in mesh respectively with the two fixed gears on the said second countershaft, and clutch means mounted on the said output shaft for selectively connecting the two rotatable gears on this shaft to the output shaft.

10. In a transmission, forward and rear vertically disposed walls, an intermediate wall between the said forward and rear walls forming respectively first and second spaces, an input shaft extending through the said three walls and having a first pair of gears mounted thereon respectively in the said two spaces, two pairs of antifriction bearings for the said input shaft and said first pair of gears mounted on the said walls with each gear having a pair of bearings located fore and aft thereof, a reverse shaft extending through the said three walls and having the second pair of gears mounted thereon respectively in the said two spaces, one of the said second pair of gears being in mesh with one of the said first pair of gears, two additional pairs of antifriction bearings for the said reverse shaft and the said second pair of gears mounted on the said walls with each gear having a pair of bearings located fore and aft thereof, a countershaft extending through the said three walls and having a third pair of gears mounted on the said countershaft respectively in the said swo spaces, the other of the said first pair of gears and the other of the said second pair of gears both being in mesh with one of the said third pair of gears, and two more pairs of antifriction bearings for the said countershaft and the said third pair of gears mounted on the said walls with each gear having a pair of bearings located fore and aft thereof.

11. In a transmission, a pair of vertically disposed end walls serving as the forward and rear walls of the transmission, an intermediate wall between the said end walls forming respectively first and second spaces, an input shaft extending through the said three walls, a first pair of gears mounted on the said input shaft respectively in the said spaces, a first clutch mounted on the external surface of the rear end wall concentrically with the said input shaft and arranged to connect one of the said first pair of gears to the input shaft, a reverse shaft extending through one of the said end walls and the said intermediate wall, a second pair of gears mounted on the said reverse shaft respectively in the said two spaces, a second clutch mounted on the external surface of the said one end wall through which the reverse shaft extends, the said second clutch being located concentrically with respect to the said reverse shaft and arranged to connect one of the said second pair of gears to the reverse shaft, a countershaft extending through the intermediate wall and one of the said end walls, a third pair of gears mounted on the said countershaft respectively in the said two spaces, a third clutch mounted on the external surface of the said end wall through which the said countershaft extends, the said third clutch being located concentrically with respect to the said countershaft and arranged to connect one of the said third pair of gears to the countershaft, and an output shaft arranged to be driven by gear means from the said countershaft and extending through at least one of the said end walls.

References Cited in the file of this patent

UNITED STATES PATENTS

| | | |
|---|---|---|
| 1,827,582 | Jacobs | Oct. 13, 1931 |
| 2,134,109 | Eckert | Oct. 25, 1938 |
| 2,465,942 | Sundt | Mar. 29, 1949 |
| 2,553,376 | Le Tourneau | May 15, 1951 |
| 2,633,754 | Gerst | Apr. 7, 1953 |

FOREIGN PATENTS

| | | |
|---|---|---|
| 649,521 | Germany | Aug. 26, 1937 |